Oct. 23, 1962

B. E. OLSSON ETAL 3,060,402

SOLDER WELL TERMINAL

Filed June 1, 1959

INVENTORS
Billy E. Olsson
BY Harold B Kalmar

Byron, Hume, Groen & Clement Attys.

United States Patent Office 3,060,402

Patented Oct. 23, 1962

3,060,402

SOLDER WELL TERMINAL

Billy E. Olsson, Chicago, and Harold B. Kalmar, Des Plaines, Ill., assignors to Malco Manufacturing Company, Chicago, Ill., a partnership

Filed June 1, 1959, Ser. No. 817,363
5 Claims. (Cl. 339—242)

The present invention relates to electrical terminal connectors and particularly to solder well terminal connectors for securing a plurality of electrical leads together.

The present invention is specifically an improvement over the subject matter described and claimed in the Maximoff and Olsson patent application Serial No. 174,653, filed February 12, 1962, which is a continuation-in-part of Serial No. 759,721, filed June 12, 1958, now abandoned, and assigned to the assignee of the present application.

Although the electrical terminal conductors of the present invention are described as being particularly adapted for use with terminal baseboards utilized in the electrical and ultra-sonic industries, the present invention should not be construed as being limited only to this use, since it has many applications in a wide variety of fields.

It is an object of the present invention to provide a new and improved electrical terminal connector.

It is another object of the present invention to provide a new and improved solder well terminal connector adapted to hold a plurality of electrical leads prior to and during a soldering operation.

It is a further object of the present invention to provide a new and improved solder well terminal connector to which a relatively small electrical conductor can be secured.

It is still another object of the present invention to provide a solder well terminal connector wherein both electrical leads of conventional size and electrical conductors of relatively smaller size are quickly and readily secured to the connector.

It is yet another object of the present invention, in accordance with the previous object, to provide suitable means for attaching one of several different-sized smaller conductors to the connector.

It is a further object of the present invention to provide a new and improved solder well terminal connector that is particularly adapted for mass production and for assembly to terminal baseboards by high speed, automatic machinery.

It is still a further object of the present invention to provide a new and improved solder well terminal connector which is readily and inexpensively manufactured, transported, and assembled.

The above and other objects are achieved in accordance with the present invention by providing a new and improved terminal connector to which a plurality of electrical leads and one of a wide range of relatively smaller leads are adapted to be attached. The connector is particularly suited to be secured to an insulating baseboard or the like and includes a body portion having suitable means for resiliently holding one or more electrical connectors. In addition, there is provided a clamping means comprising a part of the body portion and a resilient means which coact to resiliently hold one of the relatively smaller electrical leads. These relatively smaller electrical leads can only be secured to the body portion of the connector with great difficulty—if at all. In operation, the relatively smaller lead is merely wedged between the clamping means and, in order to assure that the relatively smaller lead does not become detached from the terminal connector during normal handling prior to a soldering operation, either the resilient means or the part of the body portion facing the resilient means is serrated.

The invention, both as to its organization and method of operation, taken with further objects and advantages thereof, will best be understood by reference to the following description taken in connection with the accompanying drawings, in which.

Figure 1:
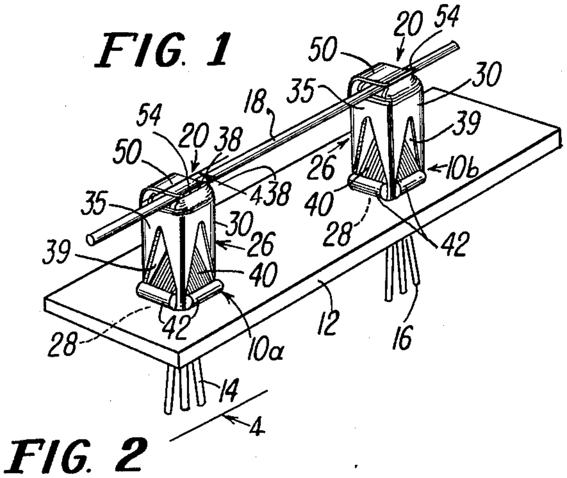
FIG. 1 is an isometric view of a pair of terminal connectors embodying the principles of the present invention, the connectors being illustrated secured to an insulating baseboard.

Referring now to the drawing, and in particular to FIG. 1, a pair of solder well terminal connectors embodying the principles of the present invention are illustrated and are identified by reference number 10. The solder well terminal connectors 10, referred to collectively as 10 and individually **10*a* and 10*b*, are mounted on a rigid insulating baseboard 12 for example, a printed circuit board on which a "printed circuit" pattern of electrically conductive material (not shown) is provided. Although the solder well terminal connectors 10 are conventionally mounted on the under surface of the insulating baseboard, the connectors 10 are illustrated as being mounted on the upper surface of the board so that the features of the present invention can be more easily understood. As described in the above-identified application, each connector 10 functions to resiliently hold and secure together a plurality of electrical leads prior to dip soldering the connector 10 and the electrical leads. As shown in FIG. 1, the solder well terminal connector 10*a* resiliently holds and secures together a plurality of electrical leads 14 while the solder well terminal connector 10*b* resiliently holds and secures together a plurality of conductors 16. Although it is not clearly shown in FIG. 1, the conductors 14 and 16 are inserted into the solder well connectors 10 through suitable openings provided in the insulating baseboard 12. In order to electrically interconnect the solder well terminal connectors 10*a* and 10*b*, a conductor 18 of relatively small diameter extends between and is secured to each of the solder well terminal connectors 10 by clamping means 20** in accordance with the features of the present invention.

Considering now the solder well terminal connectors 10 in greater detail, the connectors 10 are manufactured in chain form for efficient dispensing by automatic machinery of the type described and claimed in the Maximoff Patent No. 2,814,802, dated June 3, 1957, and the Maximoff et al. patent application Serial No. 664,240, filed June 7, 1957, both of which are assigned to the predecessor of the assignee of the present invention. In chain form, the solder well terminal connectors 10 are integrally secured in spaced apart relation along one edge of a flexible metallic feed strip. In actual practice, the above-referred to automatic machinery moves the strip along a desired path, the terminals are severed from the strip and dispensed in a preselected pattern, and then the terminals are permanently secured to an insulating baseboard, similar to baseboard 12, in an entirely automatic operation.

Figure 2:
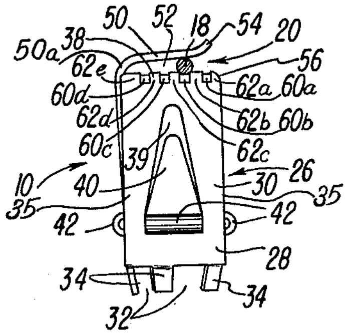
FIG. 2 is an enlarged side elevational view of one of the connectors of FIG. 1 prior to attachment to the insulating baseboard.
Figure 4:
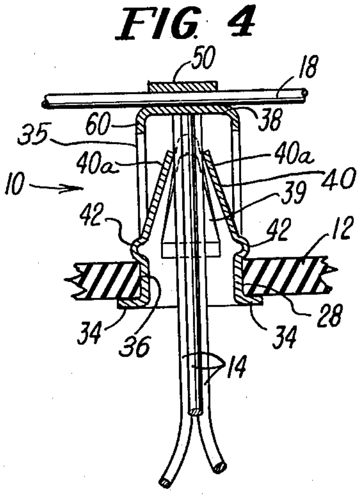
FIG. 4 is a sectional view taken along line 4—4 of FIG. 1.

Although the constructional details of the solder well terminal connector 10, with the exception of the clamping means 20, are described in detail in the above-identified application, the solder well terminal connector **10*a***, which is identically constructed to connector 10b, will be briefly described. As shown, the solder well terminal connector 10a comprises a generally four-sided sheet metal body 26 including a lower fastening portion 28 and an upper solder well portion 30. As shown in FIG. 2, the fastening portion 28 is provided with a plurality of endwise notches or slots 32 forming a plurality of fastening or staking tabs 34 therebetween. The fastening portion 28 is inserted through an aperture 36 (see FIG. 4) extending through the insulating baseboard 12, the solder well terminal connector 10 being permanently secured to the baseboard 12 by bending over the tabs 34, as shown in FIG. 4. The insertion of the fastening portion 28 and the deformation of its tabs 34 is performed automatically by the above-referred to automatic machinery.

The solder well portion 30 of the terminal connector 10a is integrally formed with the fastening portion 28 and, in contrast to the generally cylindrical connector described in the above-identified application, the solder well portion 30 includes generally right-angularly related walls 35 which are interconnected at their upper ends by a roof 38. The walls 35 actually extend into the lower fastening portion 28 and define a chamber or solder well 39 opened at its lower end to accommodate the electrical leads 14. Four holding or gripping fingers 40 are respectively cut away from the four walls 35 to extend inwardly and upwardly in the solder well 39, as shown in FIG. 4. These fingers 40 are resilient and coact or grip one or more of the electrical leads 14 inserted into the solder well 39, the electrical leads 14 being of different types and sizes and comprising, as is well known, conductors, wires, tube prongs, resistor leads, and electrically conductive parts of other electrical components.

Referring now to FIG. 4 wherein the internal construction of the connector 10a is clearly illustrated, to provide good electrical connection between the terminal connector 10a and the electrical leads 14, the gripping fingers 40 are formed as elongated isosceles triangles having converging sides severed from the walls 35 and having bases integrally connected to the junctures of the fastening portion 28 and the solder well portion 30. The gripping fingers 40 extend upwardly into the solder well portion 30 in converging cantilever relation towards the roof 38, the apexes 40a of the fingers 40 coacting with the stripped ends of the conductors 14. Prior to insertion of the stripped ends of conductors 14 into the terminal conductor 10a, the apexes 40a of the four gripping fingers 40 normally engage or substantially engage one another. However, incident to insertion of one or more of the electrical leads 14 into the solder well 30 of the connector 10a, the fingers 40a are spread apart, whereby the resiliency of the fingers 40a causes the leads 14 to be gripped and held in place.

In order to permit free flexing of the gripping fingers 40 and to assure that the fingers 40 are resiliently urged toward one another, spring curls 42 are formed at the bases of the fingers 40, i.e., at the junctures of the fastening portion 28 and the solder well portion 30. These spring curls 42 actually shorten the gripping fingers 40, as best seen in FIG. 4, so that the fingers 40 are freely flexible without interference with the walls 35. The springs 42 provide an intermittent bead which engages or abuts the upper surface of the insulating baseboard 12 when the terminal connector 10a is inserted through the aperture 36. Thus, the intermittent bead and the deformed tabs 34 coact to permanently and rigidly secure the terminal connector 10a to the insulating baseboard 12.

It will be appreciated that the conductors 14 and 16 are held firmly in the solder well terminal connectors 10a and 10b and do not move out of the solder well even though the insulating baseboard 12 is subjected to rough handling during subsequent assembly operations. In certain applications, the connection provided by the gripping fingers 40 is sufficient while, in the normal case, the conductors 14 and 16 are soldered to their associated solder well terminal connectors 10. In practice, the insulating baseboard 12 is inverted and the terminal connectors 10 with the inserted conductors 14 and 16 are dipped into a bath of molten solder so that molten solder freely flows through the apertured walls 35 into the solder well 39 to provide a solder connection between the leads and the roof 38 and between the leads and the fingers 40. Thus, in addition to the fingers 40 holding the leads 14 and 16 prior to the soldering operation, the fingers 40 provide anchoring means for the solder surrounding the leads.

The gripping fingers 40 and the resilient spring curls 42 permit the terminal connectors 10 to accommodate and hold electrical leads of different size and of different number. In practice, one to six leads, depending upon their size, can be quickly and easily inserted into the solder well 39 and firmly held therein by the gripping fingers 40. However, it has been observed that there is a limit to the sizes of wire that can be easily inserted into the connector. In actual practice some difficulty has been experienced in inserting relatively small electrical leads and, particularly, fine wire or the like, into the connectors 10. More specifically, even though the fine wire is successfully introduced into the solder well 39, the fine wire is frequently not gripped or engaged by the fingers 40, with the result that the wire can be easily and inadvertently withdrawn from the connectors 10. Furthermore, in certain applications, it is desirable to directly interconnect the solder well terminals 10 in order to electrically connect the junctions of the electrical leads 14 and the electrical leads 16.

Figure 3:
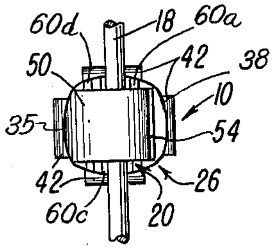
FIG. 3 is a top plan view of the connector of FIG. 2.

In accordance with the present invention, the solder well terminal connector 10a, and of course the terminal connector 10b, embodies a clamping means 20 for securing the relatively fine wire or the like to the body 26 of the connector 10a. To this end, the clamping means 20 includes, as shown in FIGS. 1, 2, 3 and 4, the roof 38 of the solder well portion 30 and an integral, resilient clamping plate 50 which actually comprises a vertical extension of one of the walls 35 of the solder well portion 30. The clamping plate 50, similar to the body 26 of the connector 10, is made of sheet metal and has a generally square configuration as best seen in FIG. 3. The entire left end 50a of the clamping plate 50 as seen in FIG. 2, is integrally connected to the wall 35 and is bent or deformed so that substantially the entire clamping plate 50 overlies the roof 38 of the connector 10a in a generally horizontal position. The square clamping plate 50 is spaced from and inclined relative to the roof 38, from left to right as viewed in FIG. 2, to provide a generally wedge-shaped space 52 for accommodating the relatively fine wire 18.

It will be appreciated that since the clamping plate 50 and the roof 38 form a wedge-shaped space 52, a variety of different sized fine wires or conductors can be held by the clamping means 20 since a fine wire within a predetermined range, is frictionally and resiliently held at some point between the plate 50 and the roof 38, irrespective of its diameter, as the wire is moved to the left in the space 52. Hence, if the fine wire has a relatively large diameter, it is frictionally held adjacent to the right end of the plate 50 and roof 38 as viewed in FIG. 2. However, if the fine wire has a relatively small diameter, it is frictionally held adjacent to the left end of the plate 50 and roof 38. Of course, a fine wire of intermediate diameter is frictionally held intermediate the ends of the plate 50 and roof 38.

In order to facilitate insertion of the fine wire 18 into the space 52, the end of the clamping plate 50 remote from its integrally connected end 50a is flared upwardly, as indicated at 54. Thus, a diverging structure is provided by the flared end 54 and the curved upward end 56 of the wall 35 for the purpose of guiding the relatively fine wire 18 into the space 52. In actual practice, the fine wire 18 is positioned adjacent the flared end 54 and the curved upper end 56 and is then moved to the left until it is snugly wedged between the inclined plate 50 and the roof 38, the plate 50 being engaged and cammed upwardly by the leftwardly moving wire 18. The inherent resiliency of the plate 50 applies a clamping force to the wire 18 thereby frictionally restraining the wire 18 against either rightward or leftward movement. In those installations in which a fine wire is not attached to a solder well terminal connector 10, the end of the clamping plate 50 is not flared and, moreover, the entire plate 50 is flattened against the surface of the roof 38.

In order to prevent the fine wire 18 from being inadvertently or unintentionally detached from the clamping means 20, the roof 38 is serrated across its entire upper surface. Specifically, an alternate groove and ridge structure, best seen in FIGS. 1 and 4, extends from left to right in the roof 38. The grooves are collectively identified by the reference numeral 60 and individually as **60*a*, 60*b*, 60*c* and 60*d* while the ridges are collectively identified by the reference numeral 62 and individually as 62*a*, 62*b*, 62*c*, 62*d* and 62*e*. The equally spaced apart grooves 60 and ridges 62 lie parallel to one another and, as best shown in FIGS. 2 and 4, extend partially into the upper ends of spaced walls 35 shown in FIG. 4, as well as across the entire upper surface of the roof 38. In any event, the grooves 60 and ridges 62 extend from left to right as seen in FIGS. 1 and 4 in the same direction as the flared end 54 and thereby lie substantially parallel to the flared end 54 so that the grooves 60 are adapted to successively coact with a fine wire moved into the space 52**.

Particularly, as the wire 18 is moved from its position adjacent to the flared end 54 to the left as seen in FIG. 2 into the space 52, the wire 18 rides over the ridge **62*a* and seats in the groove 60*a*. As the wire 18 continues to move leftwardly, it moves out of the groove 60*a*, rides over the ridge 62*b*, and seats in the groove 60*b*. When moving over the ridge 62*b*, the plate 50 is cammed upwardly and since the portion of the plate 50 adjacent to the groove 60*b* is closer than the portion of the plate 50 adjacent to the groove 60*a*, the wire 18 is urged into mating engagement with the groove 60*b* by the resilient plate 50. Hence, when a force is applied to the wire to move it out of the clamping means 20, the force must overcome both the clamping force developed by the clamping plate 50 as well as the opposing force offered by the ridge 62*b*, instead of only a frictional clamping force developed between a pair of flat surfaces. If the wire 18 is moved further to the left, it moves out of the groove 60*b* rides over the ridge 62*c*, and seats into the groove 60*c*. A greater force is required for this movement than is required to move the wire from the groove 60*a* to the groove 60*b* because the adjacent portion of the plate 50 is closer to the roof 38 above the ridge 62*c* than above ridge 62*b*. Thus, a greater clamping force is developed by the plate 50 to oppose the leftwardly moving wire 18. When seated in the groove 60*c*, the wire 18 is restrained by a greater clamping and opposing force than when seated in the groove 60*b* and, consequently, a greater inadvertent force is required to remove the conductor 18 from the clamping means 20. It will be further appreciated that a comparable restraining force is developed in the clamping means when a fine wire of relatively smaller diameter is located in groove 60*d* or when a fine wire of relatively larger diameter is located in groove 60*b***.

Figure 5:
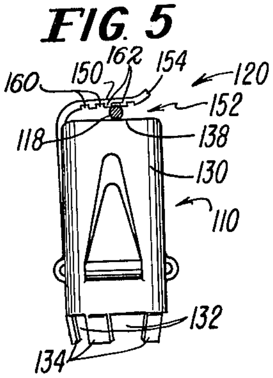
FIG. 5 is a side elevational view of another embodiment of the present invention illustrated prior to attachment to an insulating baseboard.

In another embodiment of the present invention, the solder well connector 110 includes a clamping means 120 for attaching a fine wire 118 to the connector 110. However, the clamping means 120, in contrast to the above described clamping means 20, includes a clamping plate 150 provided with a lower serrated surface. Specifically, as shown in FIG. 5, the solder well terminal connector 110 has an integral, resilient, clamping plate 150 overlying the roof 138 of a solder well portion 130. The clamping plate 150 is identically constructed to the clamping plate 50, with the exception of the groove and ridge structure, and includes a flared end 154 for guiding a fine wire into a wedge-shaped space 152 defined between the roof 138 and the plate 150. As shown, a plurality of grooves, referred to as 160, extend entirely across the lower surface of the plate 150 and are spaced apart by a plurality of ridges, referred to as 162. Similar to the grooves 60 in the first embodiment, the grooves 160 are parallel to one another and to the flared end 154 so that they successively coact with the fine wire 118 as it is inserted into the space 152. In its attached position, the wire 118 seats in one of the grooves 160 and is resiliently restrained against movement by the resilient clamping plate 150. The operation and function of the groove and ridge structure 60, 62 is identical to the groove and ridge structure described above in connection with the FIG. 1 embodiment and, to avoid unnecessary duplication, the description is not repeated.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A terminal connector for receiving and securing one or more electrical leads comprising; a hollow body having a closure wall forming a closed end in said body and a relatively open end for receiving said leads, a plurality of gripping fingers stamped out of said wall to extend inwardly of said body in converging cantilever relation away from said opening, respective offset means integrally and resiliently connecting said gripping fingers with said body, said resilient offset means thereby shortening said gripping fingers to prevent interference with said wall whereby leads inserted into the opening in said body are resiliently gripped by said fingers, and a resilient clamping lip integrally connected at one edge thereof to said body and overlying said closed end in external spaced relation therewith, said clamping lip and said closed end of said body coacting for resiliently gripping a conductive member disposed therebetween.

2. The terminal connector of claim 1 further characterized in that said clamping lip includes a flared portion at its free end to facilitate disposition of a conductive member between the clamping lip and the closed end of said body.

3. A terminal connector for receiving and securing one or more electrical leads comprising; a hollow body having a closure wall forming a closed end in said body and a relatively open end for receiving said leads, a plurality of gripping fingers struck from the material of said body, said fingers being integrally connected to said body and extending in converging relation toward said closed end with said fingers normally bending into immediately adjacent relationship to one another, said fingers being generally triangular with the converging ends constituting apexes of triangles, and a resilient clamping lip integrally connected at one edge thereof to said body and overlying said closed end in external spaced relation therewith, said clamping lip and said closed end coacting for resiliently gripping a conductive member disposed therebetween.

4. A terminal connector for receiving and securing one or more electrical leads comprising; a hollow body having a closure wall forming a closed end in said body and a relatively open end for receiving said leads at one end of said body, a plurality of gripping fingers stamped out of said wall to extend inwardly of said body in converging cantilever relation away from said opening, spring curls integrally and resiliently connecting said gripping fingers with said body and serving to shorten said fingers to prevent interference with said wall whereby leads inserted into the opening in said body are resiliently gripped by said fingers, and a resilient clamping lip integrally connected at one edge thereof to said body and overlying said closed end in external spaced relation therewith, said clamping lip and said closed end coacting for resiliently gripping a conductive member disposed therebetween, said clamping lip being inclined slightly with respect to said closed end to provide increased gripping pressure on a conductive member held between said clamping lip and said closed end as the conductive member is moved toward said one edge of said clamping lip.

5. A terminal connector for receiving and securing one or more electrical leads comprising; a hollow body having a closure wall forming a closed end in said body and an open end for receiving leads, a plurality of gripping fingers stamped out of said wall to extend inwardly of said body in converging cantilever relation away from said opening, spring curls integrally and resiliently connecting said gripping fingers with said body and serving to shorten said gripping fingers to prevent interference with said wall whereby leads inserted into said open end of said body are resiliently gripped by said fingers, a resilient clamping lip integrally connected at one edge thereof to said body and overlying said closed end in external spaced relation therewith, said clamping lip and said closed end coacting for resiliently gripping a conductive member disposed therebetween, and serrations formed on one of said clamping lip or said closed end for additionally retaining a conducting member between said lip and said closed end.

References Cited in the file of this patent

UNITED STATES PATENTS

| | | |
|---|---|---|
| 1,237,718 | Spiece | Aug. 21, 1917 |
| 1,331,928 | Katzung | Feb. 24, 1920 |
| 1,706,412 | Roberts | Mar. 26, 1929 |
| 1,706,659 | Fahnestock | Mar. 26, 1929 |
| 1,965,964 | Miner | July 10, 1934 |
| 2,026,420 | De Tar | Dec. 31, 1935 |
| 2,073,466 | Del Camp | Mar. 9, 1937 |
| 2,631,346 | Wengen et al. | Mar. 17, 1953 |
| 2,640,185 | Alden | May 26, 1953 |
| 2,650,948 | Findlay | Sept. 1, 1953 |
| 2,671,264 | Pessel | Mar. 9, 1954 |
| 2,725,544 | Strange | Nov. 29, 1955 |
| 2,745,081 | Offerman | May 8, 1956 |
| 2,884,612 | Bang | Apr. 28, 1959 |

FOREIGN PATENTS

| | | |
|---|---|---|
| 175,775 | Switzerland | May 16, 1935 |
| 657,297 | Germany | Feb. 28, 1938 |